(12) United States Patent
Meyer

(10) Patent No.: US 10,465,805 B2
(45) Date of Patent: Nov. 5, 2019

(54) SANITARY CHANGE-OVER VALVE AND ASSEMBLY COMPRISING A CHANGE-OVER VALVE OF THIS TYPE

(71) Applicant: Neoperl GmbH, Mullheim (DE)

(72) Inventor: Burkhard Meyer, Emmendingen (DE)

(73) Assignee: NEOPERL GMBH, Mullheim (DE)

( * ) Notice: Subject to any disclaimer, the term of this patent is extended or adjusted under 35 U.S.C. 154(b) by 70 days.

(21) Appl. No.: 15/548,968

(22) PCT Filed: Mar. 9, 2016

(86) PCT No.: PCT/EP2016/000416
§ 371 (c)(1),
(2) Date: Aug. 4, 2017

(87) PCT Pub. No.: WO2016/142060
PCT Pub. Date: Sep. 15, 2016

(65) Prior Publication Data
US 2018/0038492 A1    Feb. 8, 2018

(30) Foreign Application Priority Data
Mar. 9, 2015    (DE) .................... 20 2015 001 758 U

(51) Int. Cl.
*G05D 11/00*    (2006.01)
*F16K 11/044*   (2006.01)
(Continued)

(52) U.S. Cl.
CPC .......... *F16K 11/0445* (2013.01); *F16K 11/00* (2013.01); *F16K 11/025* (2013.01);
(Continued)

(58) Field of Classification Search
CPC ....... Y10T 137/2683; Y10T 137/87249; E03C 2201/30
See application file for complete search history.

(56) References Cited

U.S. PATENT DOCUMENTS

| 2,949,933 | A | * | 8/1960 | Moen | ........................ | F16K 3/18 |
| | | | | | | 137/119.08 |
| 4,609,006 | A | * | 9/1986 | Parkison | ................... | E03C 1/04 |
| | | | | | | 137/119.04 |

(Continued)

FOREIGN PATENT DOCUMENTS

| DE | 4039280 | 6/1992 |
| EP | 0583599 | 7/1993 |

(Continued)

*Primary Examiner* — Robert K Arundale
(74) *Attorney, Agent, or Firm* — Volpe and Koenig, P.C.

(57) ABSTRACT

The invention relates to a sanitary change-over valve (1) having a valve housing (2) which has one valve inlet (3) and two selectively actuatable valve outlets (4, 5), having a valve piston (6) which is movable from a first switch-over position in which the fluid is guided by way of a flow path that is routed through a first valve outlet (4) to a second switch-over position in which the fluid is guided by way of a flow path that is routed by way of a second valve outlet (5) as soon as that portion of the second flow path that is routed beyond the change-over valve (1) has been released, wherein the valve piston (6) is configured as a hollow body through which the fluid in the course of at least one of the flow paths is routed by way of at least one piston inlet (9) that is disposed on the piston circumference. The change-over valve according to the invention is characterized in that the fluid that is routed by way of the at least one piston inlet (9) in the course of the second flow path is routed by way of a first piston outlet that is provided on that piston end side that faces away from the piston base (10), and in that a flow throttle (12), a flow regulator (11), or a return flow preventer is provided in the first piston outlet.

14 Claims, 17 Drawing Sheets

(51) Int. Cl.
  *F16K 11/00* (2006.01)
  *F16K 11/10* (2006.01)
  *F16K 15/02* (2006.01)
  *F16K 11/02* (2006.01)
  *E03C 1/04* (2006.01)

(52) U.S. Cl.
  CPC ............ *F16K 11/105* (2013.01); *F16K 15/02* (2013.01); *E03C 1/0408* (2013.01); *E03C 2201/30* (2013.01); *Y10T 137/2683* (2015.04)

(56) References Cited

U.S. PATENT DOCUMENTS

| | | | |
|---|---|---|---|
| 5,195,552 A | 3/1993 | Nehm | |
| 5,370,150 A | 12/1994 | Nehm | |
| 5,472,010 A * | 12/1995 | Gonzalez | E03C 1/04 137/119.08 |
| 5,752,541 A * | 5/1998 | Gonzalez | E03C 1/0403 137/119.04 |
| 6,062,249 A * | 5/2000 | Givler | F16K 11/048 137/119.04 |
| 6,557,587 B1 | 5/2003 | Chiu | |
| 7,721,761 B2 * | 5/2010 | Thomas | E03C 1/023 137/119.04 |
| 2003/0217775 A1 * | 11/2003 | Cousineau | F01P 7/16 137/625.4 |
| 2004/0011399 A1 * | 1/2004 | Segien, Jr. | E03C 1/04 137/119.01 |
| 2005/0061368 A1 * | 3/2005 | Agresta | E03C 1/04 137/119.03 |
| 2007/0012361 A1 * | 1/2007 | Shien | F16K 11/0445 137/119.05 |
| 2010/0012197 A1 | 1/2010 | Liu | |
| 2012/0031514 A1 | 2/2012 | Liu et al. | |
| 2012/0103436 A1 | 5/2012 | Ko | |
| 2012/0152387 A1 | 6/2012 | Chang et al. | |
| 2014/0054484 A1 * | 2/2014 | Chang | F16K 1/34 251/318 |

FOREIGN PATENT DOCUMENTS

| | | |
|---|---|---|
| WO | 8603272 | 6/1986 |
| WO | 2005035885 | 4/2005 |

* cited by examiner

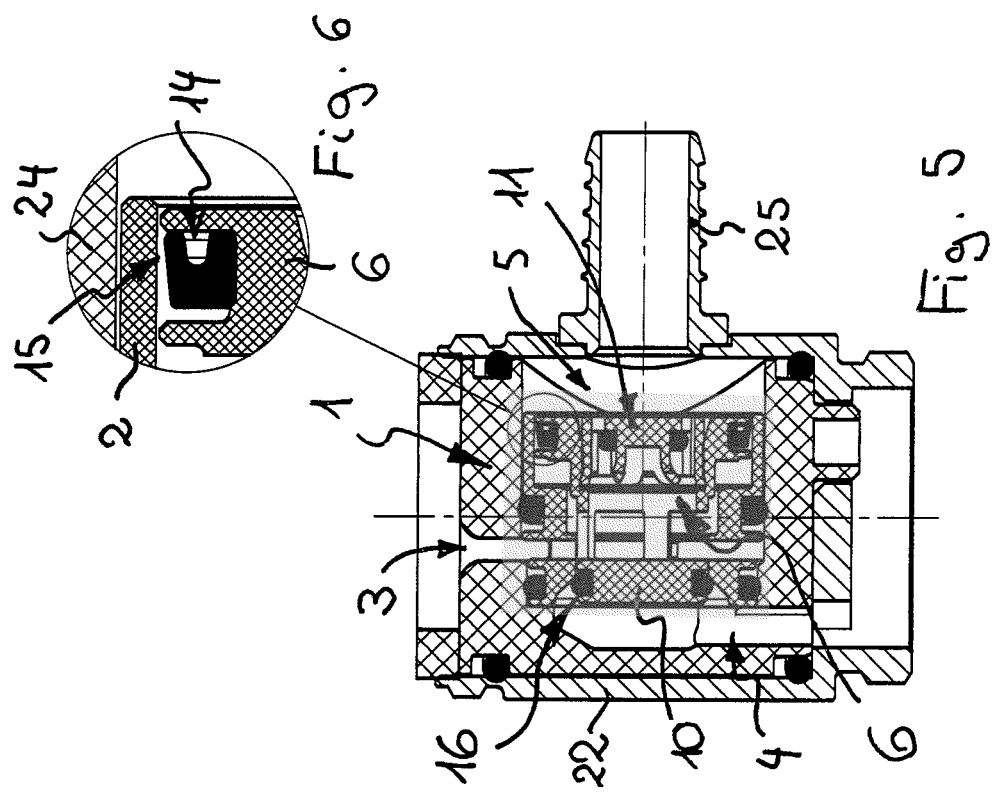
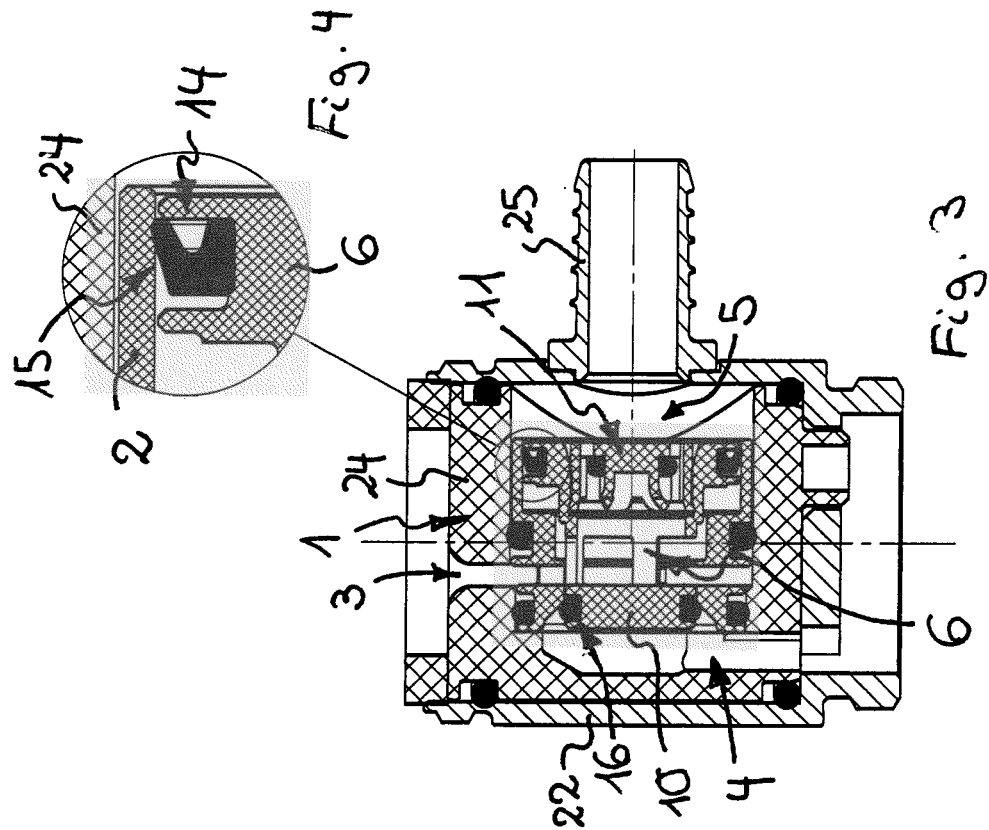

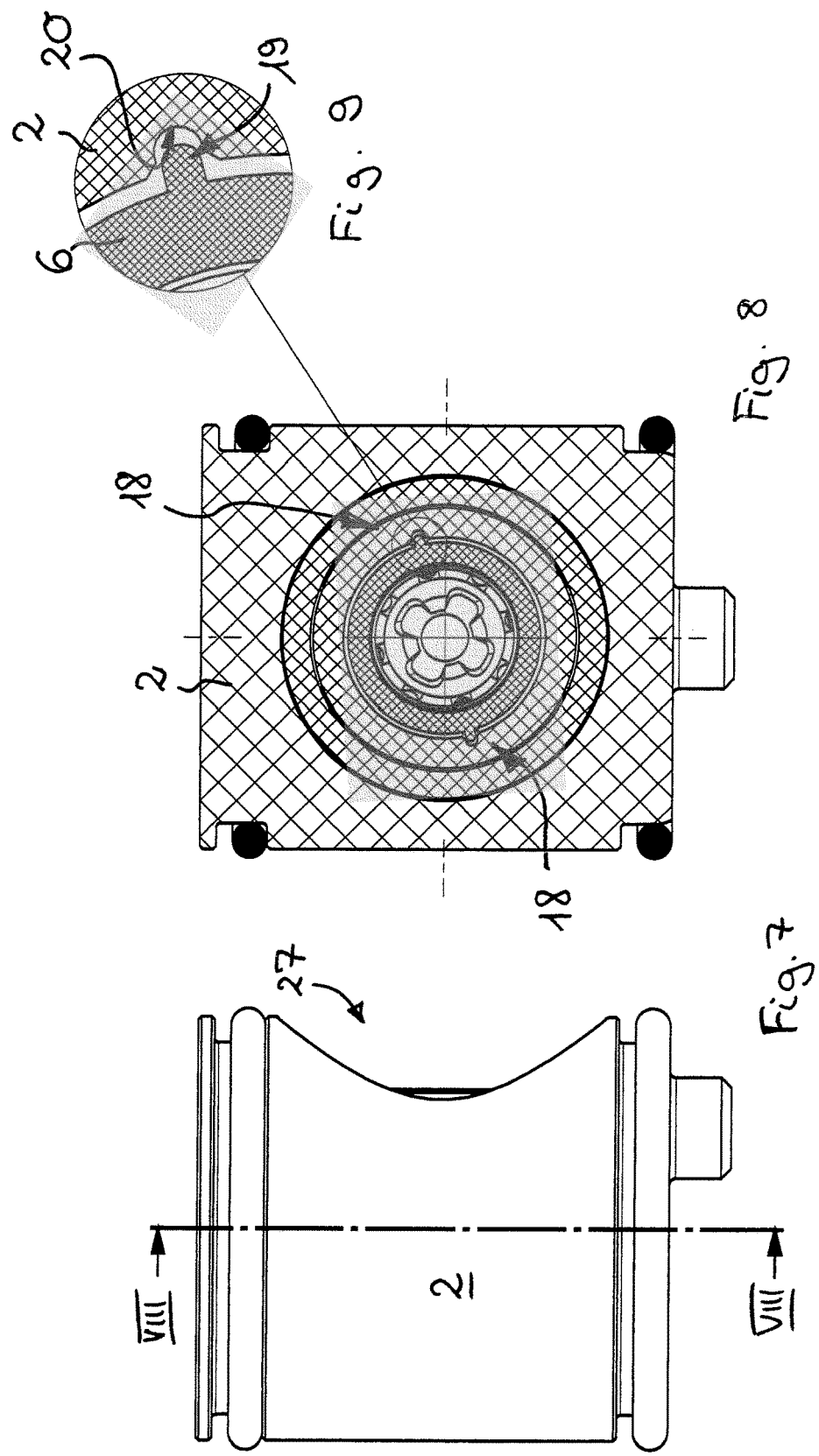

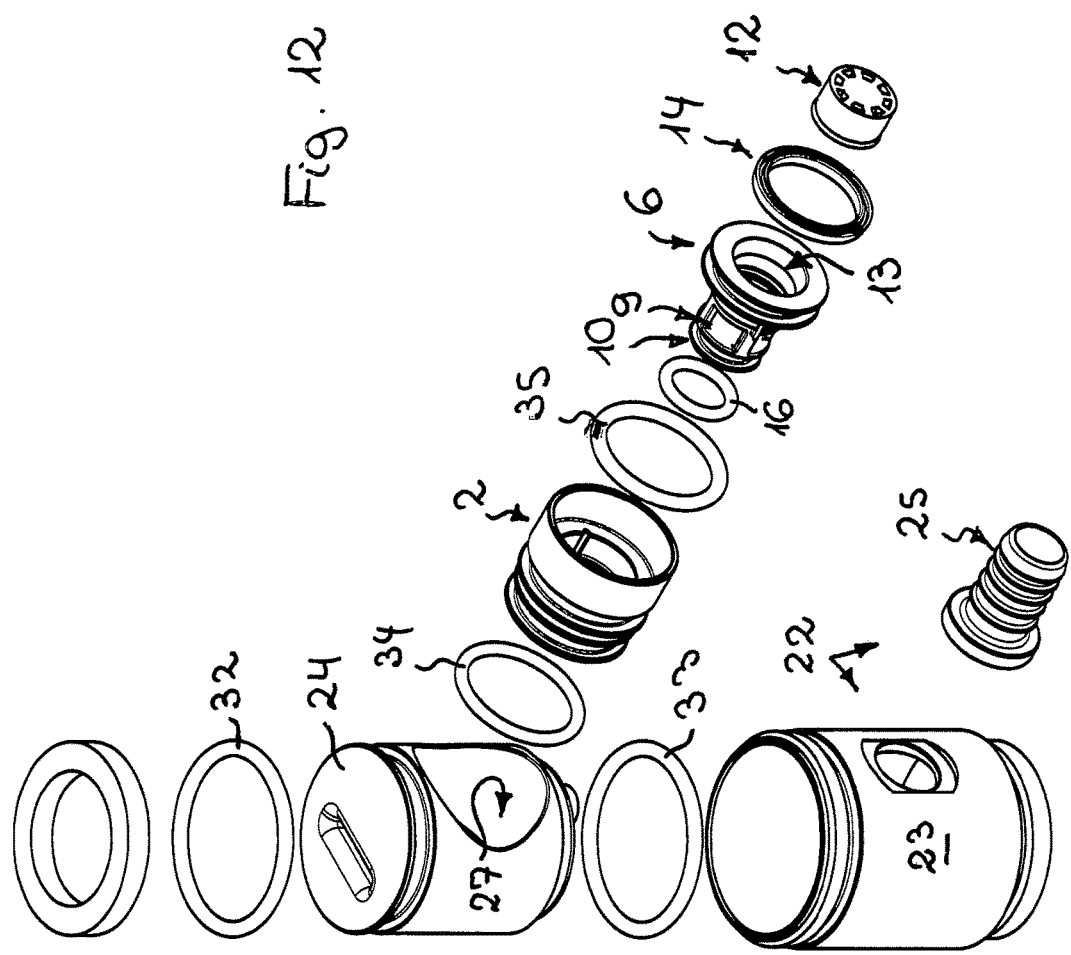

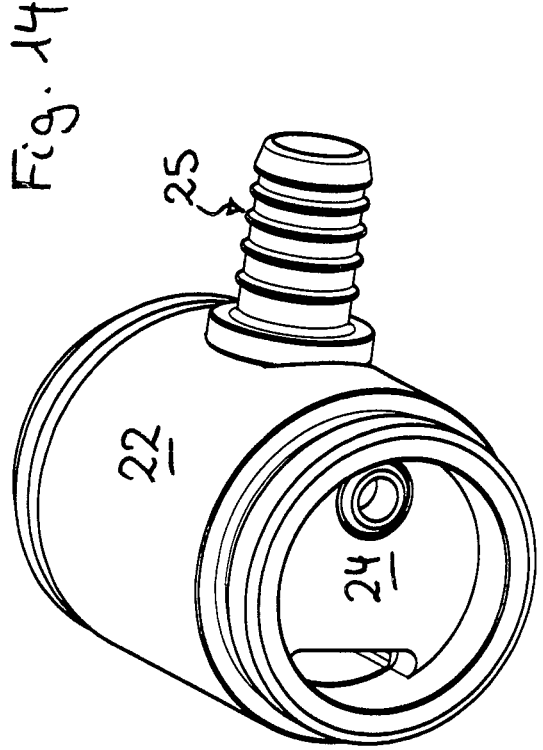
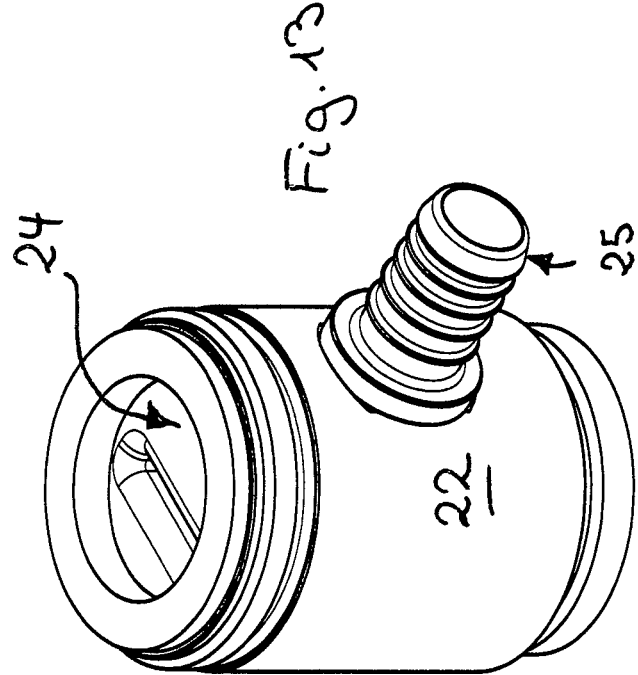

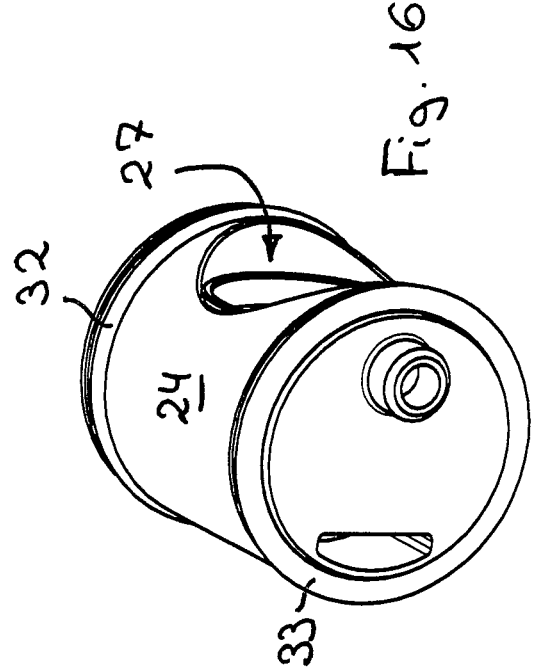
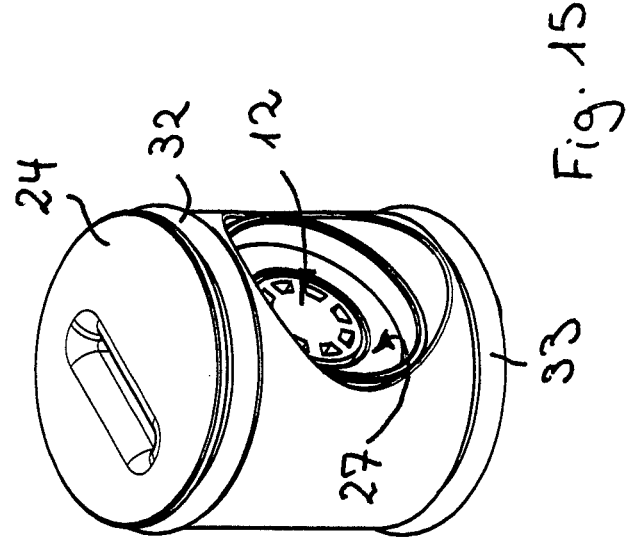

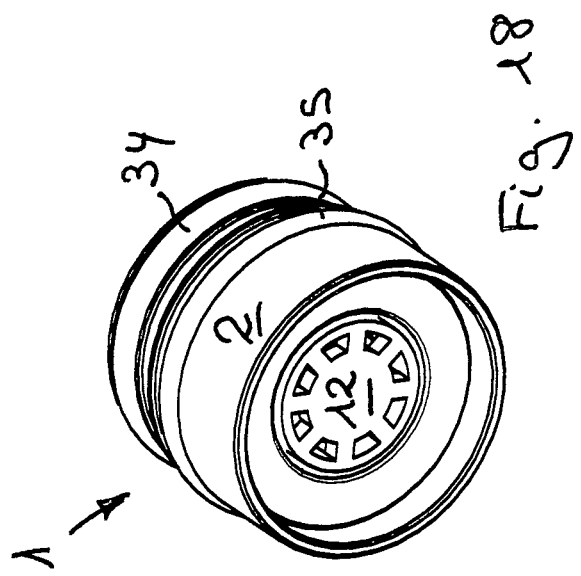
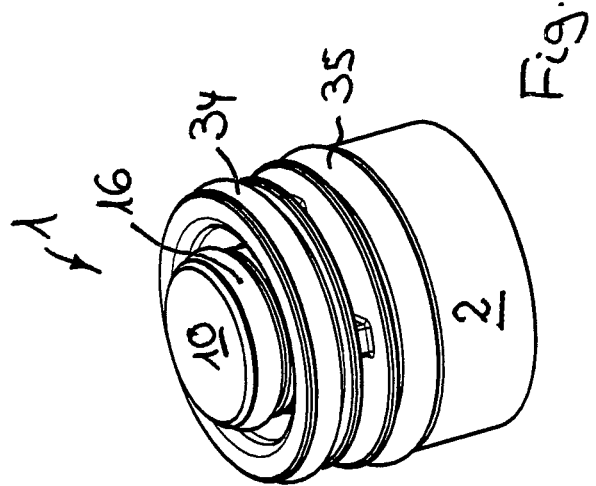

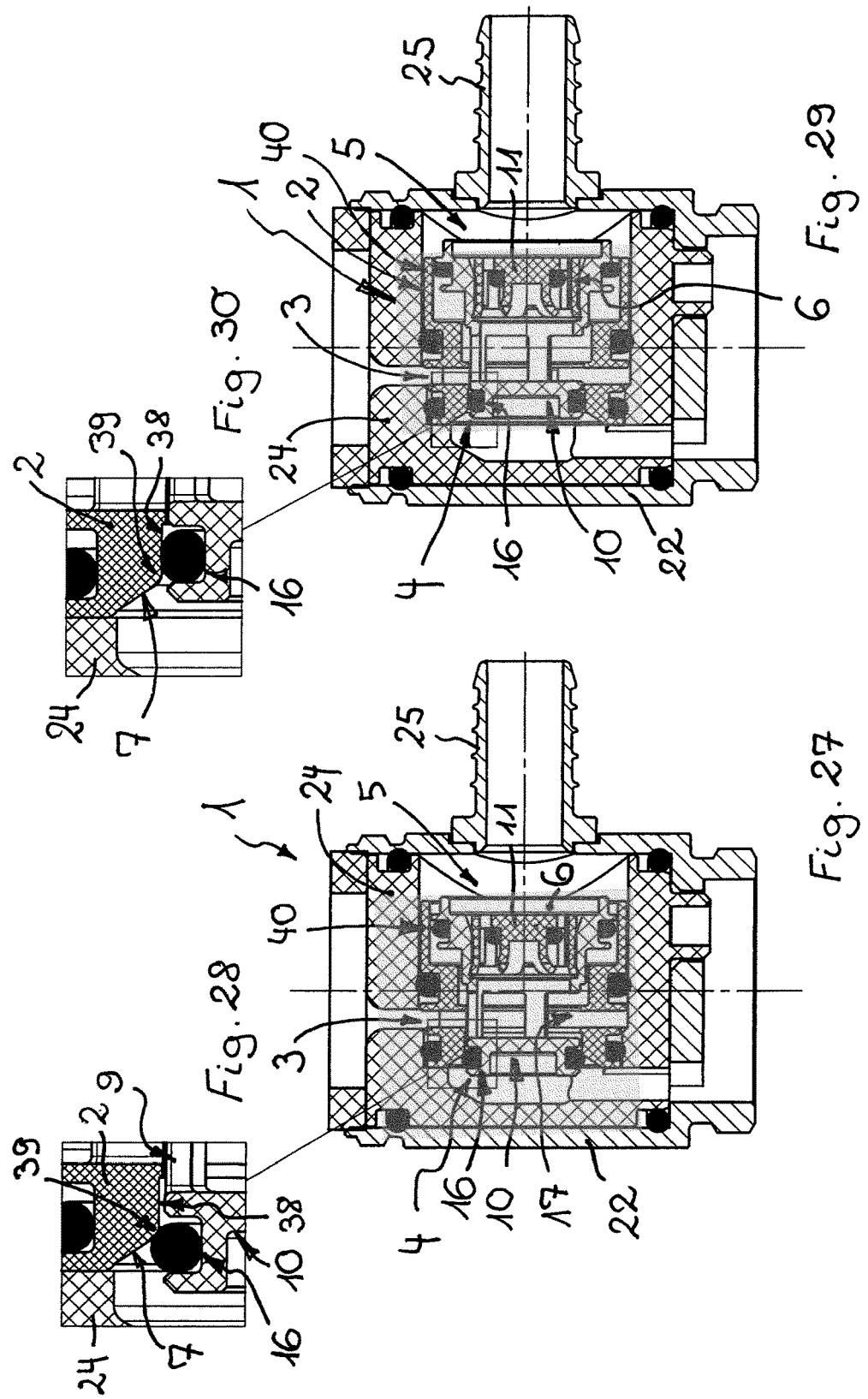

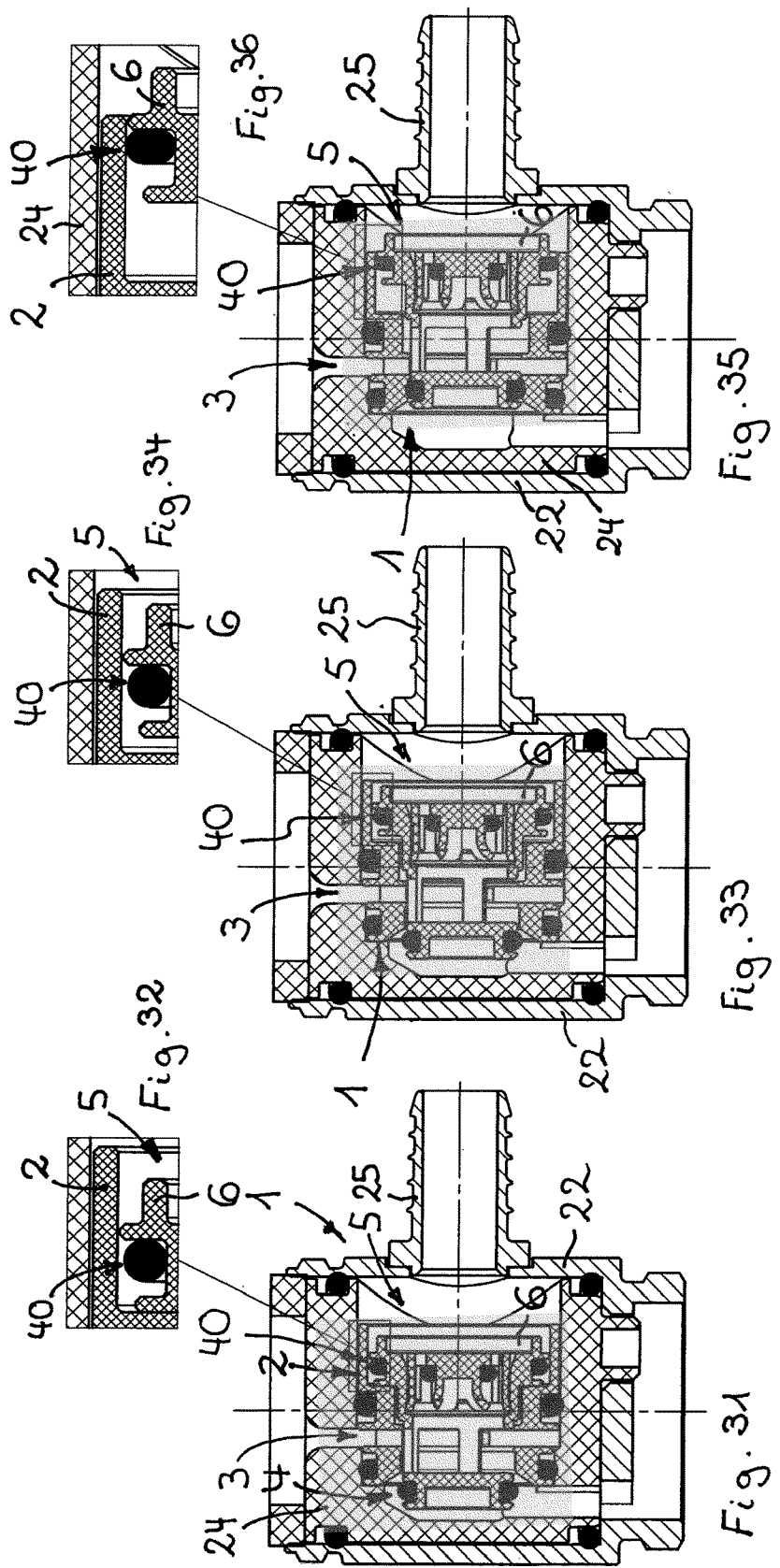

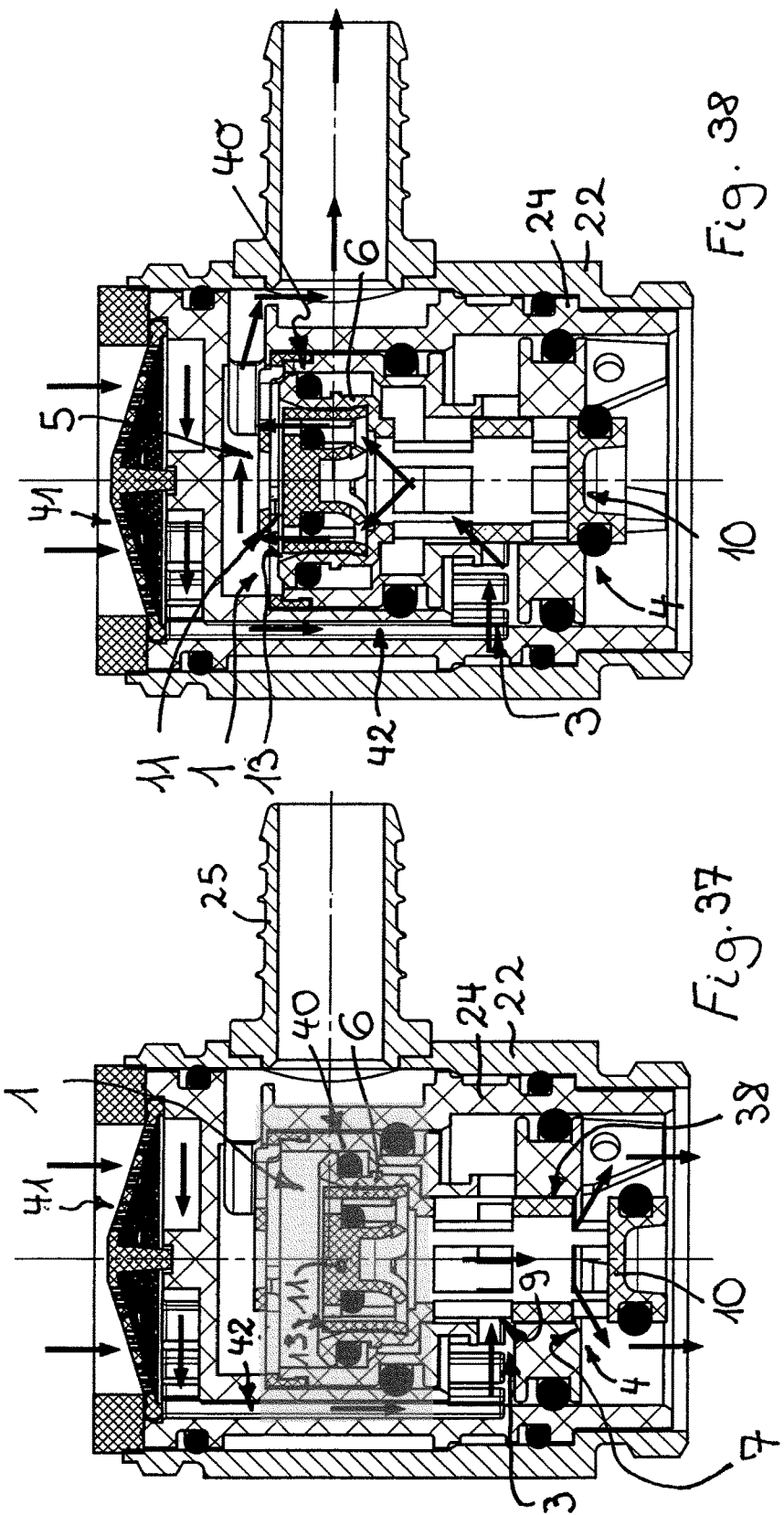

SANITARY CHANGE-OVER VALVE AND ASSEMBLY COMPRISING A CHANGE-OVER VALVE OF THIS TYPE

BACKGROUND

The invention relates to a sanitary change-over valve having a valve housing which has one valve inlet and two selectively actuatable valve outlets, having a valve piston which is movable from a first switch-over position in which the fluid is guided by way of a flow path that is routed through a first valve outlet to a second switch-over position in which the fluid is guided by way of a flow path that is routed by way of a second valve outlet as soon as that portion of the second flow path that is routed beyond the change-over valve has been released, wherein the valve piston is configured as a hollow body through which the fluid in the course of at least one of the flow paths is routed by way of at least one piston inlet that is disposed on the piston circumference.

The present invention also relates to a sanitary functional group having a change-over valve of the type mentioned at the outset.

A change-over valve of the type mentioned at the outset is already known from EP 1 664 957 B1, said change-over valve being able for example to be fitted into the water line that leads to a head shower that is fitted to a wall or a ceiling, so as to guide the water selectively on demand by way of the change-over valve or else to a hand shower that has optionally also been subsequently connected. The previously known change-over valve to this end has a valve housing having one valve inlet and two selectively actuatable valve outlets of which a first valve outlet can be routed by way of a first flow path to the head shower, for example, while a second valve outlet by way of a second flow path is assigned to the hand shower, for instance. A valve piston which is movable from the first switch-over position to the second switch-over position and back depending on whether that portion of the second flow path that is routed beyond the switch-over valve has been closed or released is guided herein so as to be displaceable in the valve housing. This valve body is configured as a hollow body through which the fluid in the course of at least one of the flow paths is routed by way of at least one piston inlet that is disposed on the piston circumference. However, the previously known change-over valve of EP 1 664 957 B1 cannot be adapted to the different requirements of different applications, in particular also in the low-pressure range. Moreover, the previously known change-over valve is of a comparatively complex construction and requires a corresponding installation space.

SUMMARY

There therefore exits the object in particular of achieving a change-over valve of the type mentioned at the outset that is constructed so as to be as simple and space-saving as possible and to be capable of universal application. Moreover, there is also the object of achieving a functional group of the type mentioned above, having such a change-over valve and likewise achieving this objective.

In the case of the sanitary change-over valve of the type mentioned at the outset, the solution according to the invention lies in particular in the fluid that is routed by way of the at least one piston inlet in the course of the second flow path being routed by way of a first piston outlet that is provided on that piston end side that faces away from the piston base, and a flow throttle, a flow regulator, or a return flow preventer being provided in the piston outlet.

The sanitary change-over valve according to the invention has a valve housing which has one valve inlet and two selectively actuatable valve outlets. A valve piston which is movable between a first and a second switch-over position is guided so as to be displaceable in the valve housing. While the fluid in the first switch-over position is guided by way of a flow path that is routed through a first valve outlet, the fluid in the second switch-over position is directed by way of a flow path that is routed by way of a second fluid outlet as soon as that portion of the second flow path that is routed beyond the change-over valve has been released and to this for example end a shut-off or regulator valve that is provided on a hand shower has been opened. The valve body herein that is guided so as to be displaceable in the valve housing is configured as a hollow body through which the fluid in the course of at least one of the flow paths is routed by way of at least one piston inlet that is disposed on the piston circumference. In order for the change-over valve now to be able to be adapted to a specific application in a simple manner, the fluid that is routed by way of the at least one piston inlet in the course of the second flow path is routed by way of a first piston outlet that is provided on that piston end side that faces away from the piston base. A flow throttle that reduces the flow cross section, a flow regulator that regulates the flow volume flowing through per unit of time to a pressure-independent flow rate, or else a return flow preventer that releases the flow path in only one direction is herein provided in this first piston outlet, wherein at least one of these sanitary accessory parts can be selected depending on the desired application. Since the hollow body interior of the valve piston is used herein for installation of the at least one sanitary accessory part, the change-over valve according to the invention is distinguished by the very simple, compact and space-saving construction mode thereof. The modular construction of the sanitary change-over valve according to the invention permits the flow throughput or the flow rate to be adapted to the requirements of the respective application by selecting the respective flow regulator or the respective flow throttle, for example. The established flow throughputs or resistances can be modified on demand herein with very little complexity by replacing the flow regulators or the flow throttles provided, said replacement being optionally performed already by the manufacturer.

In order to be able to resort to commercially available sanitary accessory parts and in order for one of the many accessory parts offered to be employed so as to correspond to the application envisaged in the change-over valve according to the invention, it is advantageous for the flow throttle, the flow regulator, or the return flow preventer to be configured as an insert cartridge, and when a cartridge receptacle is provided in the hollow-body interior of the valve piston, for the insert opening of said cartridge receptacle to be disposed on that piston end side of the valve piston that faces away from the piston base. If the flow throttle, the flow regulator, the return flow preventer, or the combination of at least two such accessory parts, is configured as an insert cartridge, the compact and space-saving construction mode of the change-over valve according to the invention and of a functional group that is assembled using the change-over valve according to the invention is facilitated.

In order for the change-over valve to be able to move from the one switch-over position to the other switch-over position and back solely on account of the associated change in pressure in the change-over valve when opening or closing the second flow path that leads to a hand shower, for example, it is advantageous for the valve piston on that piston end side thereof that faces away from the piston base to have an external circumference that is comparatively larger than that of the piston base. In this way, the back pressure that acts on the valve piston when closing the second flow path is in any case higher than the fluid pressure that acts from the first flow path, and the first flow path is reliably kept open. The area differentials that arise as a result of the dissimilar external diameters of the valve piston on account of the prevailing pressure and the throughflow cause dissimilar forces on the piston which enable the switching back and forth between the two modes. In the course of the second flow path, the resulting force on the piston face on account of the flow through the flow regulator is required for the simultaneous sealing of the first flow path, for example.

One refinement according to the invention that is worthy of independent protection provides that the valve piston on that front end region thereof that faces away from the piston base on the side of the external circumference has at least one first annular seal which is configured as an encircling lip seal, said lip seal having at least one sealing lip which is disposed obliquely to the sliding path of the valve piston in such a manner that the free lip end of the at least one sealing lip points in that direction that faces away from the piston base. In order for the functioning of the change-over valve to be ensured specifically also in the low-pressure range of approximately 0.2 bar and above, the valve piston during the second flow path must be sealed in relation to the valve housing. The use of a first annular seal that is configured as a lip seal has the advantage that the sealing lip of this lip seal can be deformed so as to correspond to the prevailing fluid pressure. If the sealing lip herein is disposed obliquely to the sliding path of the valve piston in such a manner that the free lip end of the at least one sealing lip points in that direction that faces away from the piston base, and if this lip seal is fitted so as to be reversed, that is to say counter to the prior art, the sealing lip can fold inward in the case of high pressure. This effect serves for reducing friction, on account of which the switching back and forth between the first and the second flow path is significantly improved. A further advantage is that in the case of an inwardly folded sealing lip an additional quantity of water can flow through the annular gap that remains between the piston circumference of the valve piston and the housing wall of the valve housing that borders the sliding path of the valve piston. By contrast, this annular gap without the lip seal being present would allow too much water to flow past the valve piston in the case of low pressure. This quantity of water would however be absent in the throughflow through the flow regulator or the flow throttle, on account of which an insufficient force for sealing the first flow path would be able to be generated.

By contrast, one refinement according to the invention that is worthy of independent protection provides that the valve piston on that front end region thereof that faces away from the piston base on the side of the external circumference has a first annular seal that is designed as an O-ring which under the pressure of the flow of incident fluid in the second switch-over position is deformable in such a manner that said annular seal that is designed as an O-ring seals the annular gap between the external circumference of the valve piston and the internal circumference of the valve housing. Since the first annular seal in the case of this refining embodiment is configured as an O-ring and seals the valve piston only once the second switch-over position has been reached or on the way thereto, respectively, significantly less friction results in comparison to a first annular seal which seals the valve piston permanently in relation to the valve housing. On account of the sealing of the piston in the second switch-over position as illustrated, all the water flows through the valve piston that is configured as a hollow body and through a flow regulator that is provided in the valve piston, for example, on account of which an optimized controlled-operation curve of such a flow regulator results.

It is advantageous for the valve piston on that front end region thereof that faces the piston base on the side of the external circumference to have at least one second annular seal that projects beyond the piston circumference which second annular seal in the second switch-over position bears tightly on an annularly encircling housing inner wall portion that tapers toward the valve piston in such a manner that the first flow path is tightly closed.

It is particularly advantageous for the housing inner wall portion that tapers toward the valve piston to be separated from a neighboring cylindrical housing inner wall portion by an edge, and for the valve piston in the second switch-over position to be movable under the pressure of the flow of incident fluid from a first sliding position in which the valve piston by way of the second annular seal thereof bears in a sealing manner on the edge to a second sliding position in which the second annular seal bears in a radially sealing manner on the cylindrical housing inner wall portion that preferably also guides the valve piston. The second annular seal that in the low pressure range still bears on the edge can thus seal in an axial or radial manner, respectively, so as to seal in a radial manner in the case of a comparatively high water pressure, when said second annular seal has been pushed forward in the cylindrical housing inner wall portion. Improved tightness is guaranteed in the case of comparatively high water pressures on account of such a radial sealing manner, whereas by contrast axial and radial sealing on the edge between the housing inner wall portions can be adequate in the low pressure range.

One preferred embodiment according to the invention provides that the valve piston on the piston circumference thereof has at least one second valve outlet by way of which the second flow path of the fluid is routed. If the second flow path is closed, the water flowing into the change-over valve according to the invention can run off via the second piston outlet, that is to say through the latter, by way of the first flow path, while bypassing the second annular seal.

One preferred embodiment according to the invention herein provides that the at least one second piston outlet on the piston circumference of the valve piston is provided in that piston portion that is disposed between the at least one first annular seal and the second annular seal.

One refinement according to the invention which likewise achieves the object mentioned above and for which independent protection is claimed, provides that the valve piston that is displaceably guided in the valve housing is guided in a rotationally secured manner by means of an anti-rotation safeguard. It is ensured with the aid of this anti-rotation safeguard that the valve piston during the displacing movements cannot be rotated in relation to the valve housing. It is ensured in this way that the inflow-side and outflow-side housing openings, on the one hand, and the fluid inlets and outlets that are provided in the valve piston are always disposed at the correct mutual alignment such that the throughflow is not unnecessarily reduced on account of a cross-sectional constriction that potentially arises as a result of said rotation. Since the respective openings in the valve housing, on the one hand, and in the valve piston, on the other hand, are at all times kept in the correct mutual arrangement, the potential noise development that arises in the throughflow of the change-over valve is also significantly reduced.

One particularly simple and expedient embodiment according to the invention herein provides that this anti-rotation safeguard has at least one securing groove or securing spring that is disposed on the piston circumference of the valve piston and interacts with an assigned securing spring or securing groove on that housing internal circumference of the valve housing that borders the sliding path. The securing spring that is provided on the valve piston herein can in particular be connected to the valve piston in an integral manner.

It can be advantageous in particular in the low pressure range for the valve piston on that front end region thereof that faces away from the piston base in relation to that housing internal circumference of the valve housing that borders the valve piston along the sliding path thereof to be sealed by means of a rolling diaphragm or a diaphragm seal which is held tightly on the piston circumference, on the one hand, and on the housing internal circumference, on the other hand. If the valve piston in relation to the first and to the second flow path is sealed by means of a rolling diaphragm or a like sealing diaphragm, a significantly improved functioning mode can result in particular in the low pressure range, since significantly less friction arises in the case of such a diaphragm in comparison to the lip seal that seals in a dynamic and radial manner.

In the case of the sanitary functional group of the type mentioned at the outset, the solution according to the invention of the object as set forth above in particular lies in that the valve housing of the change-over valve is inserted into an insert housing, said insert housing on its part being disposed in a coupling housing, said coupling housing having a sleeve-shaped housing portion for receiving the insert housing, a line connector for the second flow path being provided laterally on said sleeve-shaped housing portion, wherein the one front end of the sleeve-shaped housing portion forms a housing inlet of the coupling housing and the other front end forms the housing outlet of the latter.

It is advantageous herein for the insert housing from the inlet-side front side of the coupling housing to be push-fittable into the latter up to an insert detent.

It is particularly advantageous for the insert housing to have a housing receptacle for the valve housing, and for this housing receptacle of the insert housing to have an insert opening which is provided on the housing circumference of the insert housing.

BRIEF DESCRIPTION OF THE DRAWINGS

Further features according to the invention are derived from the claims in conjunction with the drawing and from the description of the figures. The invention will be described in yet more detail hereunder by means of preferred exemplary embodiments.

In the drawings:

FIG. 3 shows the change-over valve of FIGS. 1 and 2, in the longitudinal section, in the switch-over position of the valve piston as already shown in FIG. 2;

FIG. 4 shows the valve piston in a detailed view in the region as bordered in FIG. 3, a lip seal which seals between the valve piston, on the one hand, and that housing internal circumference of the valve housing that borders the sliding path, on the other hand, being provided herein on the piston external circumference of the valve piston;

FIG. 5 shows the change-over valve of FIGS. 1 to 4, again in the longitudinal section, wherein a sealing lip of the lip seal on account of the pressure is deformed inwardly toward the valve piston;

FIG. 6 shows the valve piston in a detailed view in the region as bordered in FIG. 5, wherein the sealing lip of the lip seal that is deformed inwardly toward the valve piston can be readily seen;

FIG. 7 shows the change-over valve shown in FIGS. 1 to 6, in a side view onto the valve housing of said change-over valve;

FIG. 8 shows the change-over valve of FIGS. 1 to 7 in a longitudinal section through the sectional plane VIII-VIII according to FIG. 7, wherein it can be readily seen that the valve piston is guided in the valve housing in a rotationally secured manner by means of an anti-rotation safeguard;

FIG. 9 shows a detailed longitudinal section in the region of the anti-rotation safeguard as encircled in FIG. 8;

FIG. 12 shows the change-over valve of FIGS. 1 to 11 in an exploded perspective illustration of the component parts thereof;

FIG. 13 shows a coupling housing in a perspective side view, an insert housing in which the change-over valve according to FIGS. 1 to 12 is located being inserted into said coupling housing;

FIG. 14 shows the coupling housing shown in FIG. 13, having the insert housing that is intended for receiving the change-over valve, in a perspective plan view toward the outflow side;

FIG. 15 shows the change-over valve of FIGS. 1 to 14, located in the insert housing, in a perspective side view;

FIG. 16 shows the change-over valve of FIGS. 1 to 15, located in the insert housing, in a perspective plan view toward the outflow side;

FIG. 17 shows the change-over valve of FIGS. 1 to 16 in a perspective plan view toward the one end side of the valve housing of said change-over valve;

FIG. 18 shows the change-over valve of FIGS. 1 to 17 in a perspective plan view toward the other end side of the valve housing, as compared to FIG. 17;

FIG. 27 shows a change-over valve in a longitudinal section, said change-over valve in that front end region of the valve piston thereof that faces the piston base having an annular seal that projects beyond the piston circumference which annular seal in the second switch-over position illustrated here bears on an annularly encircling housing inner wall portion that tapers toward the valve piston;

FIG. 28 shows the change-over valve of FIG. 27 in a detailed longitudinal section in the region of the annular seal thereof that bears on the tapered housing inner wall portion;

FIG. 29 shows the change-over valve of FIGS. 27 and 28 in a comparatively higher pressure range, in which the valve piston in a cylindrical housing inner wall portion that preferably guides the valve piston has been pushed forward and now radially seals the annular gap between the housing inner wall of the valve housing and the external circumference of the valve piston.

FIG. 30 shows the change-over valve of FIGS. 27 to 29 in a detailed longitudinal section according to FIG. 29 in the region of the annular seal that bears in a radially sealing manner on the cylindrical housing inner wall portion;

FIG. 31 shows a change-over valve, here illustrated in a longitudinal section, which on that front end region of the valve piston thereof that faces away from the piston base has an annular seal that is configured as an O-ring, wherein the change-over valve here is illustrated in the first switch-over position;

FIG. 32 shows the change-over valve of FIG. 31 in a detailed longitudinal section in the region of the annular seal that is provided on the side of the external circumference on the front end region that faces away from the piston base;

FIG. 33 shows the change-over valve of FIGS. 31 and 32 in a sliding position of the valve piston thereof that approximates the second switch-over position, wherein the annular seal that is provided on that front end region of the valve piston that faces away from the piston base here has not yet been deformed;

FIG. 34 shows the change-over valve of FIGS. 31 to 33 in a detailed longitudinal section according to FIG. 33, in the region of the non-deformed annular seal;

FIG. 35 shows the change-over valve that is now shown in the second switch-over position thereof, wherein the annular seal that is provided on the side of the external circumference on that front end region that faces away from the piston base under the pressure of the flow of incident fluid is deformed in such a manner that said annular seal now radially seals the annular gap between the external circumference of the valve piston, on the one hand, and the opposite housing inner wall of the valve housing, on the other hand;

FIG. 36 shows the change-over valve of FIGS. 31 to 35 in a detailed longitudinal section according to FIG. 35, in the region of the annular seal that is deformed under the high pressure of the flow of incident fluid;

FIG. 37 shows a change-over valve illustrated in the longitudinal section, which by means of an insert housing is inserted into a coupling housing, wherein the valve piston of the change-over valve here is guided so as to be axially displaceable in the direction of the inflowing fluid, and wherein the change-over valve here has been illustrated in the first switch-over position thereof;

FIG. 38 shows the change-over valve of FIG. 37 in the second switch-over position of the valve piston thereof.

DETAILED DESCRIPTION OF THE DRAWINGS

Figure 1:
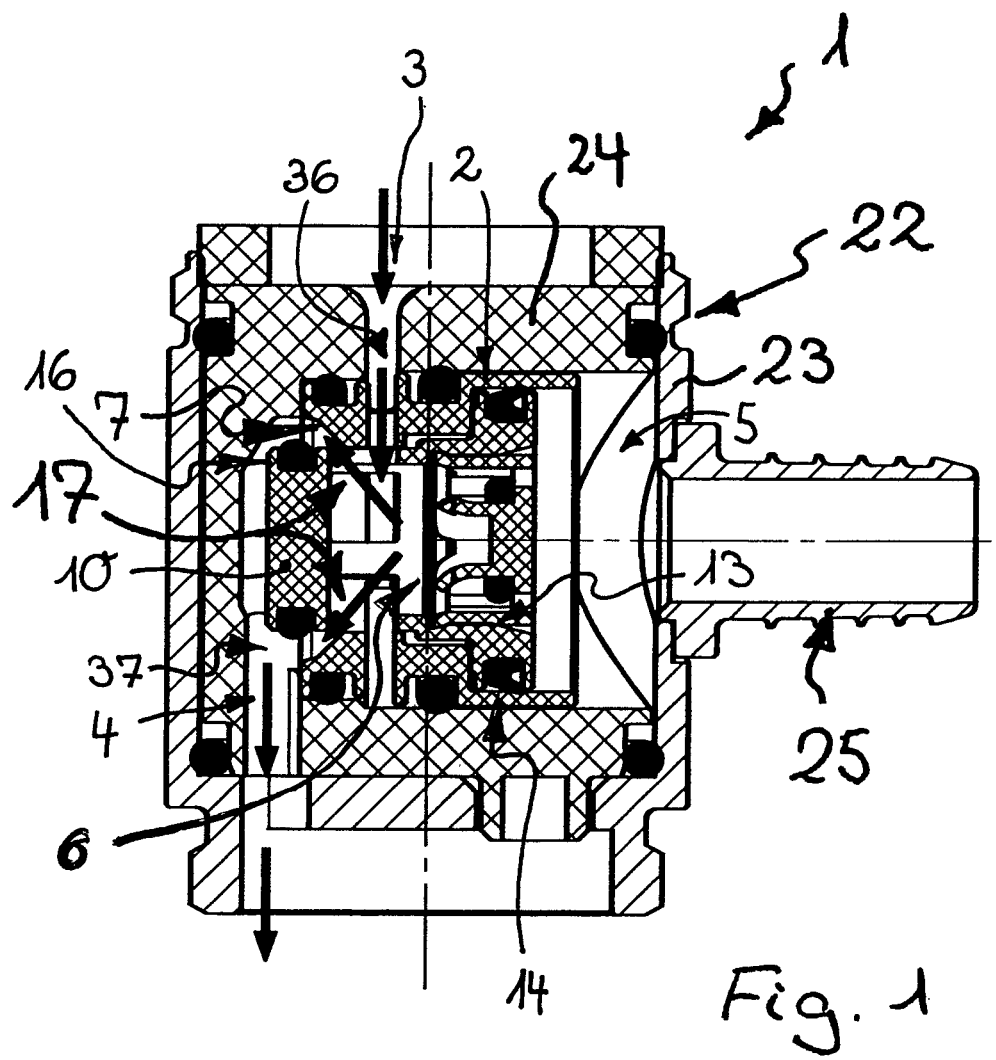
FIG. 1 shows a change-over valve that is illustrated in a longitudinal section, a valve piston being guided in the valve housing of said change-over valve so as to be displaceable between a first switch-over position (shown here) and second switch-over position.
Figure 2:
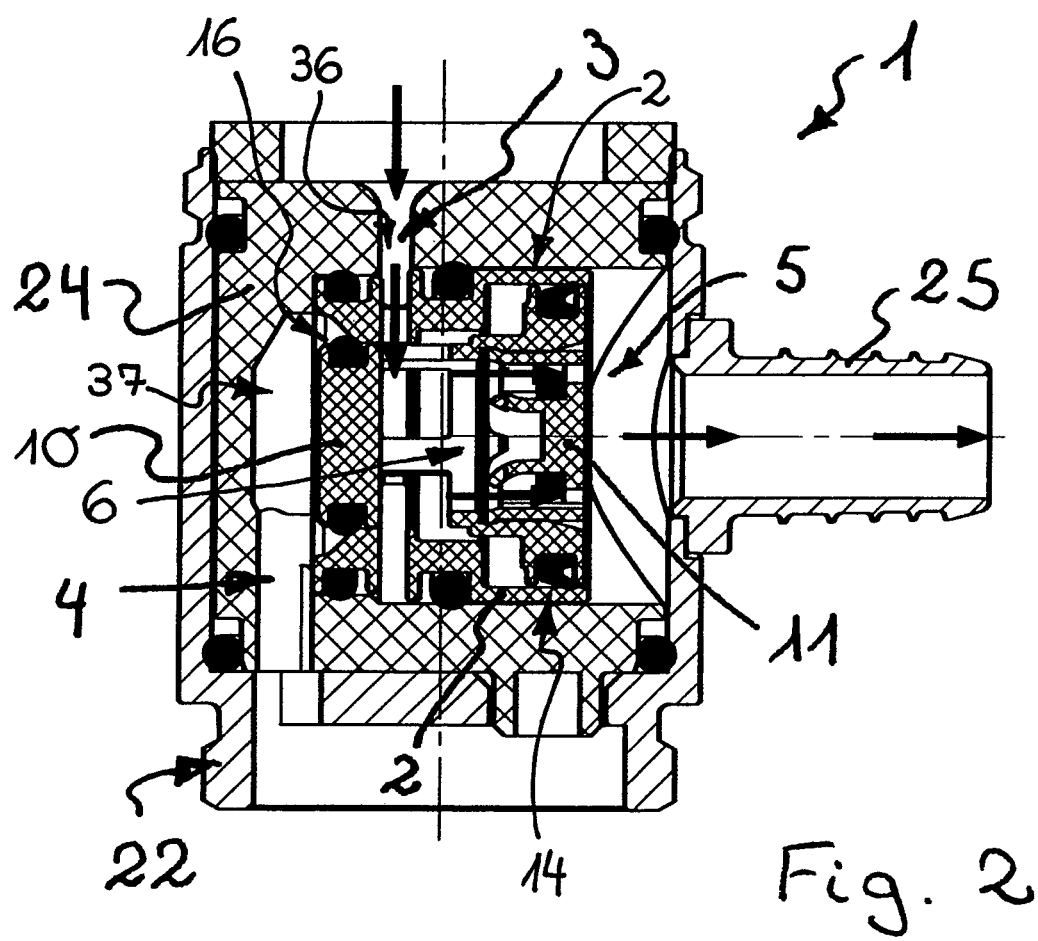
FIG. 2 shows the change-over valve of FIG. 1, likewise in the longitudinal section, in the second switch-over position of the valve piston thereof.
Figure 11:
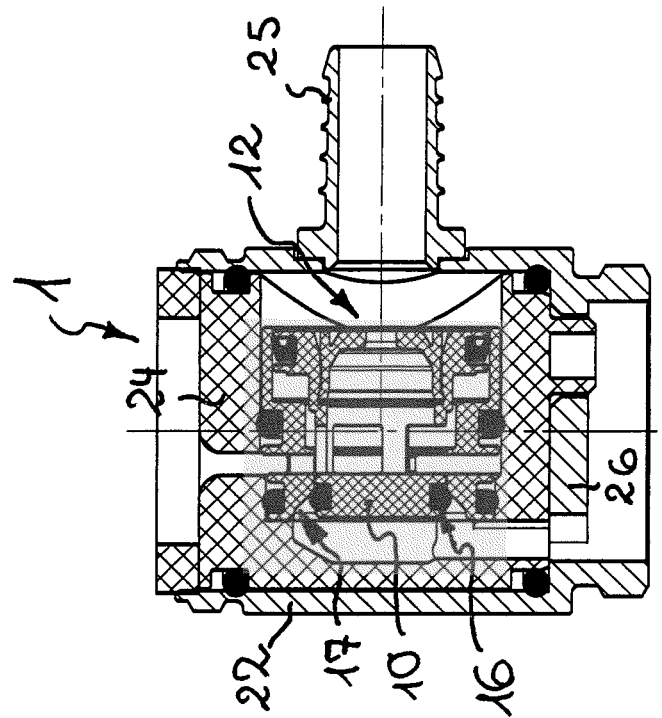
FIG. 11 shows the change-over valve of FIG. 10 which here however, in order to adapt to another application, instead of the flow regulator now has a flow throttle in the valve piston of said change-over valve.
Figure 10:
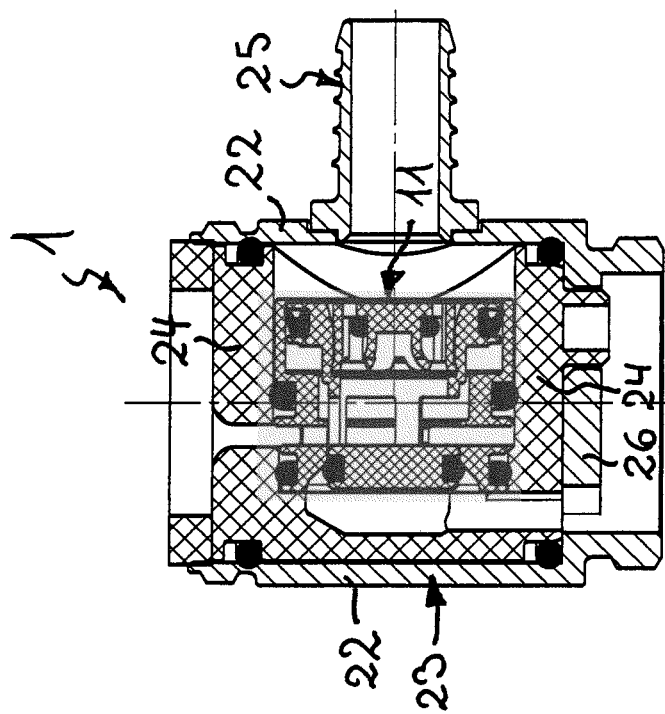
FIG. 10 shows a change-over valve that is comparable to that of FIGS. 1 to 9, which in the valve piston thereof that is configured as a hollow body has a flow regulator.

In FIGS. 1 to 39 a sanitary change-over valve 1 is shown in various embodiments and exemplary applications. The change-over valve 1 here is intended for installation in a water line, so as to allow the water to selectively exit either from the one water outlet or from another water outlet on demand. The sanitary change-over valve 1 has a valve housing 2 which has one valve inlet 3 and two selectively actuatable valve outlets 4, 5. A valve piston 6 which is movable, for example, between the first switch-over position shown in FIG. 1 and the second switch-over position shown for comparison in FIG. 2 is guided so as to be displaceable in the valve housing 2. While the water in the first switch-over position according to FIG. 1 is guided by way of a flow path that is routed through the first valve outlet 4, the fluid in the second switch-over position according to FIG. 2 is directed by way of a flow path that is routed by way of the second valve outlet 5 as soon as that portion of the second flow path that is routed beyond the change-over valve 1 has been released, and to this end a shut-off or regulator valve that is provided on a hand shower, for example, has been opened.

The valve piston 6 that is guided so as to be displaceable in the valve housing 2 is configured as a hollow body through which the water in the course of at least one of the flow paths is routed by way of at least one piston inlet 9 that is disposed on the piston circumference. In order for the change-over valve 1 to now be able to be adapted in a simple manner to a specific application, the fluid that is routed by way of the at least one piston inlet 9 in the course of the second flow path is routed according to FIG. 2 by way of a first piston outlet that is provided on that piston end side that faces away from the piston base 10. A return flow preventer is provided in said first piston outlet. It becomes clear by comparing FIGS. 10 and 11 that the flow regulator 11 shown in FIG. 10, or the flow throttle 12 illustrated in FIG. 11, can also be provided in addition to or instead of such a return flow preventer. These sanitary accessory parts 11, 12 here are configured as an insert cartridge, wherein a cartridge receptacle 13 is provided in the hollow body interior of the valve piston 6, the insert opening of said cartridge receptacle being disposed on that piston end side of the valve piston 6 that faces away from the piston base 10.

In order for the change-over valve 1 to be able to now be adapted to a specific application in a simple manner, the flow throttle 12 that reduces the flow cross section, or the flow regulator 11 that regulates the flow volume per unit of time to a pressure-independent flow rate, for example, can be provided in the first piston outlet of the valve piston 6, wherein at least one of these sanitary accessory parts 11, 12 can be selected depending on the desired application. Since the hollow body interior of the valve piston 6 is used herein for the installation of the at least one sanitary accessory part 11, 12, the change-over valve 1 illustrated here is distinguished by the simple, compact, and space-saving construction mode thereof.

Since the valve piston 6 on that piston end side thereof that faces away from the piston base 10 has the cartridge receptacle 13 into which the flow regulator 11 that is configured as an insert cartridge, or the flow throttle 12 that is likewise designed as an insert cartridge, can be inserted, commercially available sanitary accessory parts can also be resorted to when this is required by the envisaged application.

It becomes evident from a comparison of the longitudinal sections in FIGS. 1, 2, 3, 5, 10, 11, 19, 20, and 27 to 38, that the valve piston 6 on that piston end side that faces away from the piston base 10 has an external circumference that is comparatively larger than that of the piston base 10. In this way, the back pressure that acts on the valve piston 6 when closing the second flow path according to FIG. 1 is in any case higher than the fluid pressure that acts from the first flow path, and the first flow path remains open. The area differentials that arise as a result of the dissimilar external diameters on the opposite lying end sides of valve piston cause dissimilar forces on the piston which enable the switching back and forth between the two modes which are shown in an exemplary manner in FIGS. 1 and 2. In the mode shown in FIG. 2, the resulting force on the piston face of the valve piston 6 on account of the throughflow of the flow regulator 11 used therein is required for simultaneously sealing the first flow path.

It can be seen in FIGS. 3 to 6 that the valve piston 6 on that front end region thereof that faces away from the piston base 10 on the side of the external circumference has a first annular seal which is configured as an encircling lip seal 14 which has a sealing lip 15, said sealing lip 15 being disposed obliquely to the sliding path of the valve body 6 in such a manner that the free lip end of said sealing lip 15 points in that direction that faces away from the piston base 10. In order for the functioning of the change-over valve 1 to be ensured specifically also in the low-pressure range of approximately 0.2 bar and above, the valve piston 6 is to be sealed in relation to the valve housing 2, in particular in the course of the second flow path shown in FIG. 2. The first annular seal that in FIGS. 3 to 6 to this end is configured as the lip seal 14 offers the advantage that said lip seal 14 can deform so as to correspond to the prevailing pressure. As opposed to the prior art, this lip seal 14 is fitted into the change-over valve 1 so as to be reversed. The sealing lip 15 herein is folded inward in the case of a correspondingly high pressure. This effect, shown in detail in FIGS. 5 and 6, serves for reducing friction, on account of which the switching back and forth between the first and the second flow path is significantly improved. Moreover, an additional quantity of water can flow through the annular gap remaining between the sealing lip 15 and the housing internal circumference of the valve housing 2. By contrast, without the lip seal 14 being present, in the case of a low pressure too much water could potentially flow through this annular gap past the valve piston 6. This quantity of water would however be absent in the throughflow through the flow regulator 11 or the flow throttle 12, on account of which an insufficient force of the first flow path would be generated in the course of the second flow path.

By contrast, the valve piston 6 on that front end region thereof that faces the piston base 10 on the side of the external circumference has at least one second annular seal 16 which is configured as an O-ring and projects beyond the piston circumference. This annular seal 16 in the second switch-over position according to FIG. 2 bears tightly on an annularly encircling oblique face that tapers toward the valve piston 6 in such a manner that the first flow path is tightly closed. This oblique face is formed by the annularly encircling housing inner wall portion 7.

It becomes clear from FIG. 1 and from FIGS. 27 to 39 that the valve piston 6 on the piston circumference thereof, preferably in that piston portion that is disposed between the at least one first annular seal 14, 40, on the one hand, and the second annular seal 16, on the other hand, has at least one second piston outlet 17 by way of which the first flow path of the fluid is routed. It also becomes clear from FIG. 1 that to this end the at least one piston window that is provided on the piston circumference and serves as the piston inlet 9 can be dimensioned to be so large that the housing inlet duct 36 that leads to the piston inlet 9 and the housing outlet duct 37 that leads away from the valve piston 6 are "short circuited" by way of the piston interior.

It is indicated in FIGS. 7 to 9 that the valve piston 6 that is displaceably guided in the valve housing 2 is guided in a rotationally secure manner by means of an anti-rotation safeguard 18. This anti-rotation safeguard 18 here has at least one securing spring 19 that is disposed on the piston circumference of the valve piston 2 and interacts with an assigned securing groove 20 on that housing internal circumference of the valve housing 2 that borders the sliding path. Since the valve piston 6 on account thereof is secured against unintentional rotation in relation to the valve housing 2, the window cutouts forming the fluid inlets and outlets in the valve piston 6, on the one hand, and in the valve housing 2, on the other hand, are always in the correct mutual alignment. On account thereof, a cross-sectional constriction and a throughflow that is even more reduced are prevented. A noise development which could result from such unintentional cross-sectional constrictions is likewise prevented.

Figure 20:
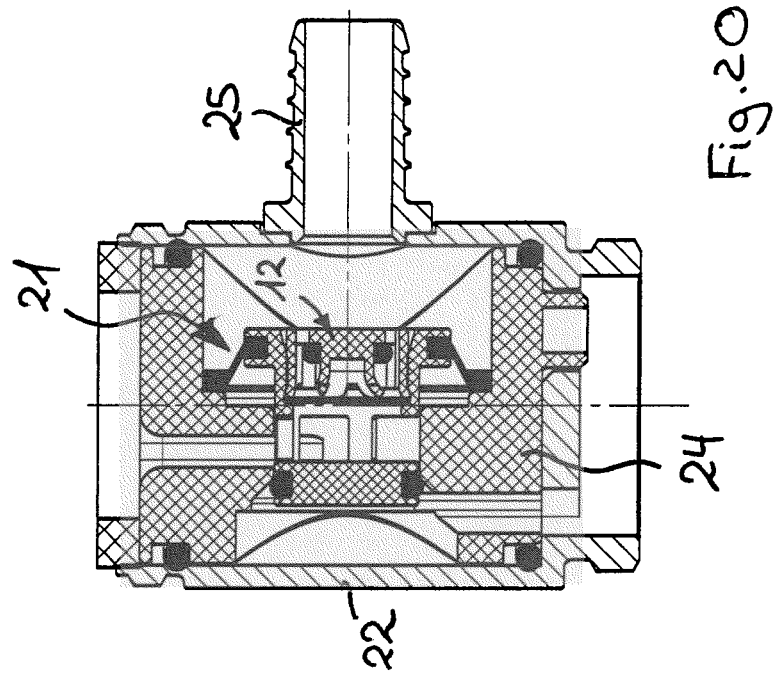
FIG. 20 shows the change-over valve of FIG. 19 in a switch-over position of the valve piston thereof that is modified as compared to FIG. 19.
Figure 19:
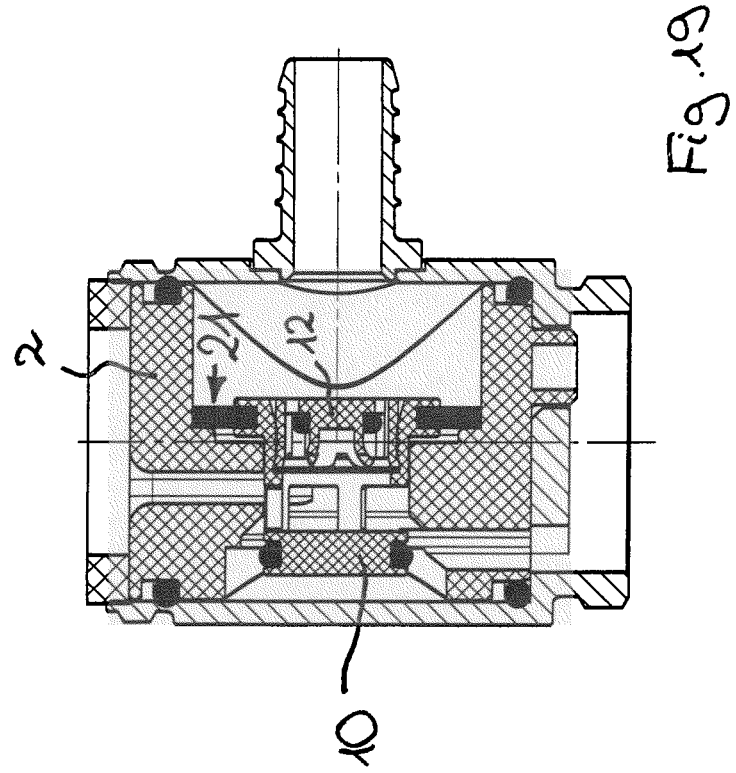
FIG. 19 shows a change-over valve in the longitudinal section, which is substantially comparable to the change-over valve according to FIGS. 1 to 18, wherein however the valve piston in relation to that housing internal circumference that borders the sliding path is sealed by means of a rolling diaphragm.

A change-over valve 1 in which the valve piston on that front end region thereof that faces away from the piston base 10 in relation to that housing internal circumference of the valve housing 2 that borders the valve piston 6 along the sliding path thereof is sealed by means of a rolling diaphragm 21 is shown in FIGS. 19 and 20. This rolling diaphragm 21 is held tightly on the piston circumference of the valve piston 6, on the one hand, and on the housing internal circumference of the valve housing 2, on the other hand. The functioning mode of the change-over valve in particular in the low pressure range is further improved by such a rolling diaphragm 21, since significantly less friction arises in the case of such a diaphragm in comparison to an annular seal that seals in a dynamic and radial manner, or to a lip seal 14.

The change-over valve 1 illustrated here is used as a component part of a sanitary functional group which has a coupling housing 22. The functional group with the aid of this coupling housing 22 can be interdisposed between two mutually adjacent line portions of a water line. This coupling housing 22 has a sleeve-shaped housing portion 23 for receiving an insert housing 24. A line connector 25 for the second flow path is provided laterally on the sleeve-shaped housing portion 23 of the coupling housing 22. While the one front end of the sleeve-shaped housing portion 23 forms one housing inlet, the other front end of the coupling housing 22 is designed as a housing outlet. In order for components required to be reduced, the valve housing can however also be inserted directly into a coupling housing 22, if a separated insert housing 24 is to be dispensed with, as is shown in an exemplary manner by FIGS. 19 and 20.

When the water path through the valve housing 2 is active, the annular seals 32, 33 that are provided on the external circumference of the valve housing 2 separate the valve inlet 3 of the valve housing 2 from the flow paths that are in each case assigned to one of the valve outlets 4 or 5. In the course of the second flow patch the lip seal 14 tightly seals between the piston external circumference of the valve piston 6, on the one hand, and the housing internal circumference of the valve housing 2, on the other hand, in such manner that all the water must flow through the flow regulator 11 that is provided in the valve piston 6, or through the flow throttle 12 that is disposed instead therein. The sealing rings 34, 35 that are provided on the external circumference of the insert housing and on the opposite front end regions of the insert housing 24 seal the annular gap remaining between the insert housing 24 and the coupling housing 22 and thus likewise the flow paths that lead to the valve outlets 4, 5. The insert housing 24 serves for deflecting the two flow paths and enables simple fitting of the valve housing 2 in the coupling housing 22. A line connector 25 for the second flow path is provided laterally on the sleeve-shaped housing portion 23 of the coupling housing 22. A desired additional application, for example a hand shower, can be connected to this laterally projecting line connector 25 by way of a preferably flexible hose. The insert housing 24 from the inlet-side end side of the coupling housing 22 is push-fittable into the sleeve-shaped housing portion 23 thereof up to an insert detent 26. The insert housing 24 has a housing receptacle 27 for the valve housing 2, wherein this housing receptacle 27 of the insert housing 24 has an insert opening which is provided on the housing external circumference of the insert housing 24 and is approximately aligned with the lateral line connector of the coupling housing 22.

The change-over valve 1 illustrated here by replacing the accessory parts that are inserted into the valve piston 6 of the former can be adapted in a simple manner to a wide variety of applications. Various flow rate regulators 11 or various throttles 12 can also be inserted into the valve piston 6 herein. The use of an adjustable flow throttle or of an adjustable flow regulator is also possible.

The change-over valve 1 illustrated here, which is advantageously employable also in the low pressure range of approximately 0.2 bar and above, is distinguished by the reduced installation height thereof, the good potential for adaptation thereof to the various applications, and by being capable of universal application. Since the component parts of the change-over valve 1 are pushed into one another in a cartridge-type manner, fitting of the change-over valve 1 according to the invention is significantly simplified.

Figure 21:
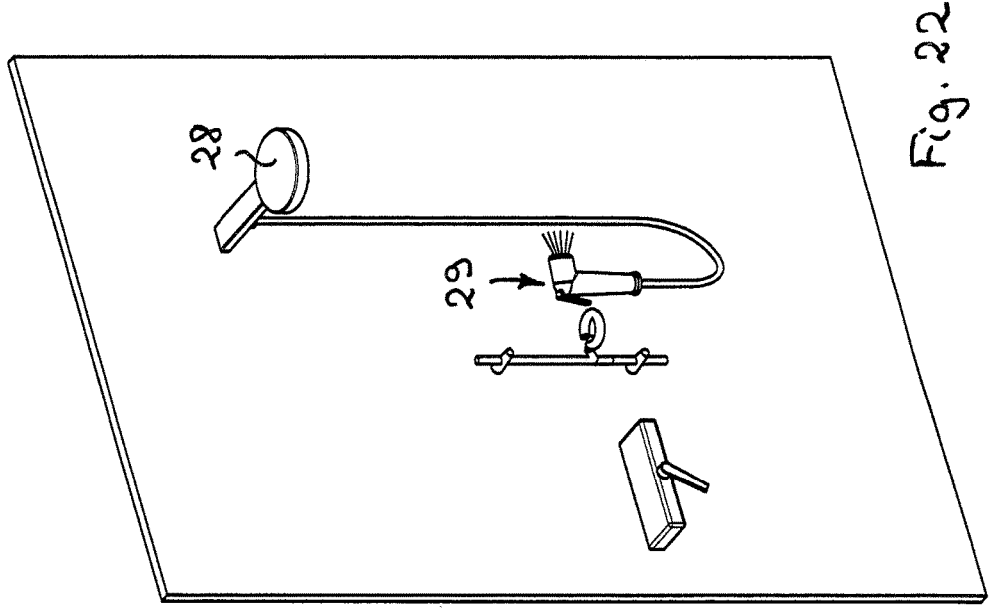
FIG. 21 shows an exemplary application for a change-over valve according to FIGS. 1 to 20, wherein the change-over valve here is provided for switching between a head shower that is fitted to the wall, on the one hand, and a hand shower that is held on a flexible hose line, on the other hand.
Figure 22:
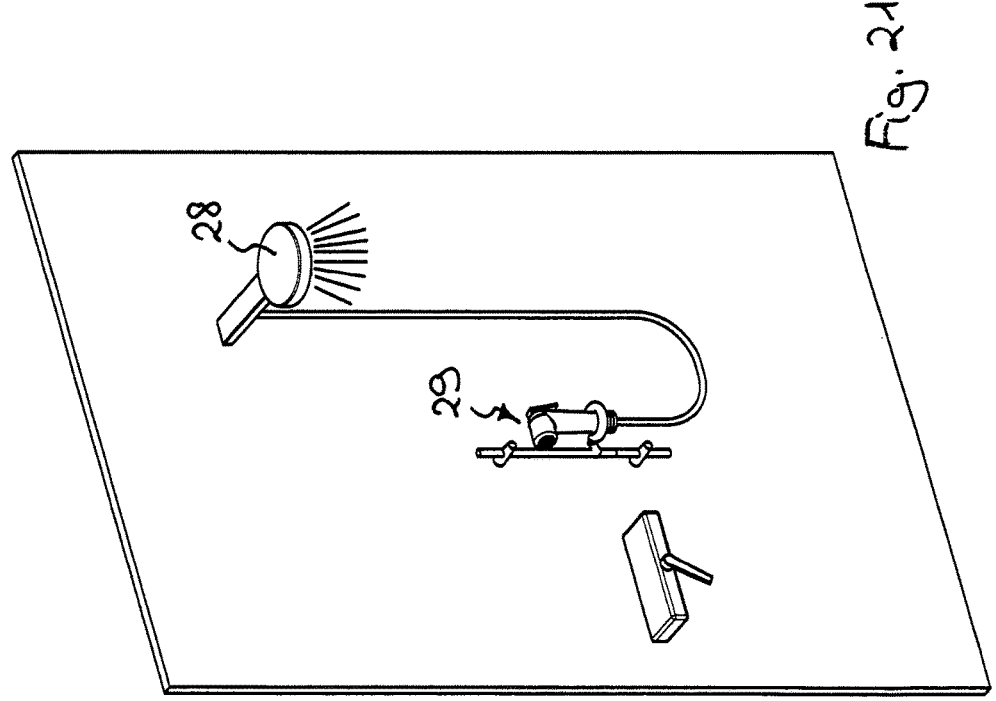
FIG. 22 shows the exemplary application shown in FIG. 21, wherein the flow path leading to the hand shower is now opened.
Figure 24:
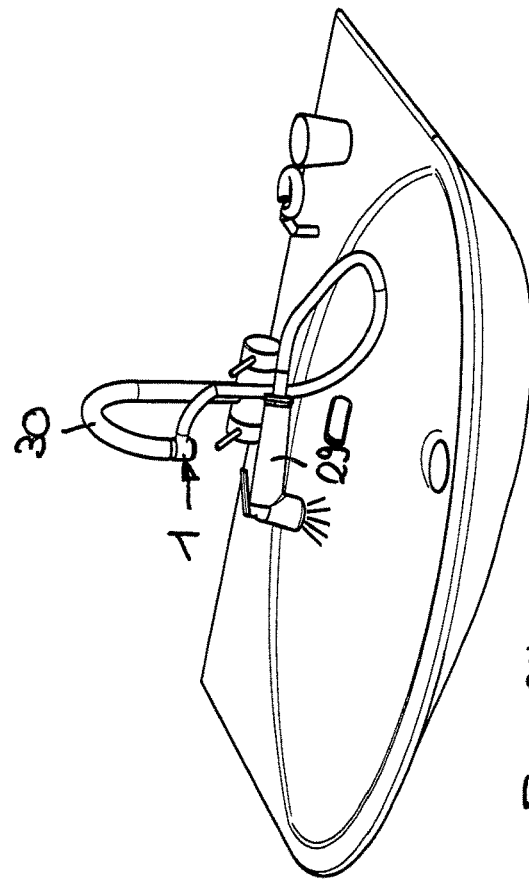
FIG. 24 shows the exemplary application shown in FIG. 23, wherein the outflowing water here now runs via the hand shower.
Figure 23:
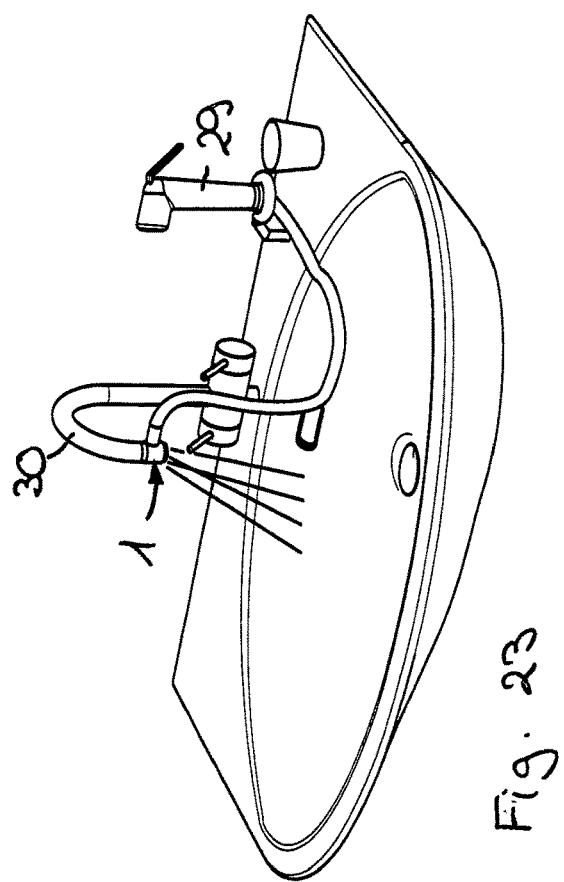
FIG. 23 shows another exemplary application for the change-over valve shown in FIGS. 1 to 20, wherein the change-over valve here is provided for switching between the water outflow of a sanitary water outflow fitting, on the one hand, and a hand shower, on the other hand.
Figure 26:
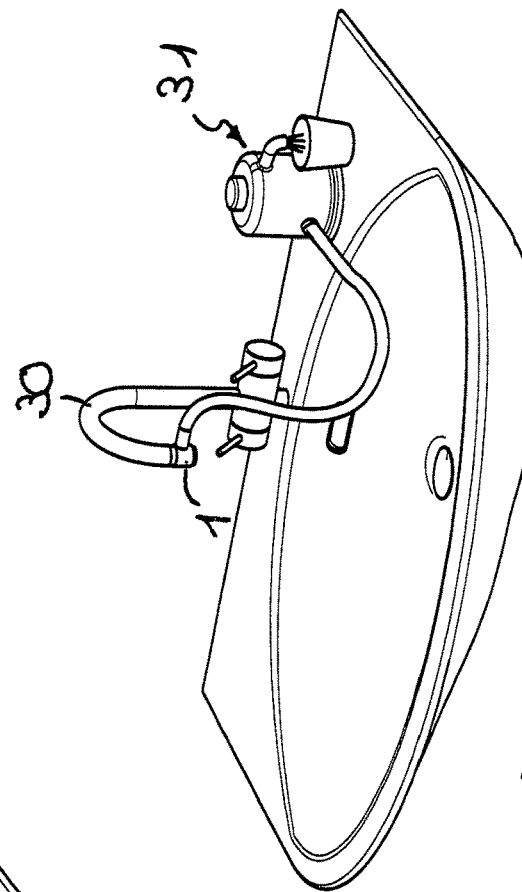
FIG. 26 shows the exemplary application shown in FIG. 25, wherein here however the flow path that leads to the water outlet of the water filter has been opened.
Figure 25:
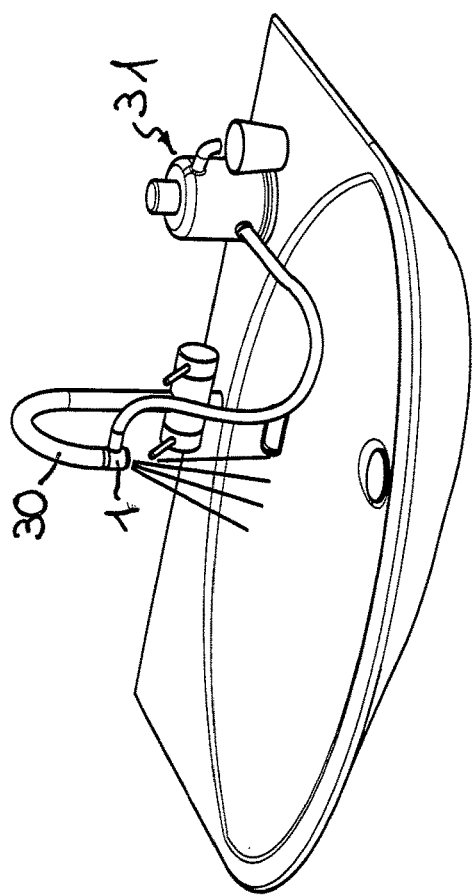
FIG. 25 shows a further exemplary application in which the change-over valve according to FIGS. 1 to 20 for switching is capable of being switched between the water outflow of a sanitary outflow fitting, on the one hand, and the water outlet of a water filter.

In the exemplary embodiment shown in FIGS. 21 and 22 it is illustrated that the change-over valve (not to be identified in more detail here) can also be interdisposed in the water line that leads to a head shower 28 that is fitted to a wall or a ceiling, so as to be able to switch over on demand between the head shower 28 and a hand shower 29 that is actuatable by way of the second flow path. As is shown by the exemplary embodiment shown in FIGS. 23 and 24, the change-over valve 1 by virtue of the space-saving construction thereof can also be interdisposed in the water outflow of a sanitary outflow fitting 30 so as to have available on demand also a hand shower 29 in addition to said water outflow. In the example shown in FIGS. 25 and 26, the change-over valve 1 is likewise screw-fitted to the water outflow of a sanitary outflow fitting 30 so as to be able to retrieve on demand water from the supply system by way of the water outlet of a separate water filter 31.

A further exemplary embodiment of the sanitary change-over valve 1 is illustrated in FIGS. 27 to 30. FIGS. 27 to 30 show said change-over valve 1 in the second switch-over position thereof, in which the second annular seal 16 which projects on the side of the external circumference on that front end region that faces the piston base 10 of the valve piston 6 bears in a sealing manner on the housing inner wall of the valve housing 2. This housing inner wall also in the case of the exemplary embodiment shown here is subdivided into two neighboring housing inner wall portions 7, 38, of which that housing inner wall portion 7 that faces away from the second valve outlet 5 of the valve housing 2 tapers toward the valve piston 6 and of which that housing inner wall portion 38 that faces the second valve outlet 5 here is designed to be cylindrical. The neighboring housing inner wall portions 7, 38 are mutually separated by an annularly encircling edge 39 on the housing internal circumference. It now becomes evident from a comparison of FIGS. 27 and 28, on the one hand, and of FIGS. 29 and 30, on the other hand, that the valve piston 6 in the second switch-over position shown here on account of the pressure of the flow of incident fluid is movable from the first sliding position in which the valve piston 6 by way of the second annular seal 16 thereof bears in a sealing manner on the edge 39 to the second sliding position, shown in FIGS. 29 and 30, in which the second annular seal 16 bears in a radially sealing manner on the neighboring cylindrical housing inner wall portion 38.

A further exemplary embodiment of the sanitary change-over valve 1, the valve piston 6 of which on that front end region thereof that faces away from the piston base 10 having on the side of the external circumference an annular seal 40 of an elastic material is shown in FIGS. 31 to 36. While the change-over valve 1 in FIGS. 31 and 32 is shown in the first switch-over position thereof, the change-over valve 1 in FIGS. 35 and 36 is illustrated in the second switch-over position thereof. By contrast, FIGS. 33 and 34 show the change-over valve 1 in an intermediate position between the first switch-over position according to FIGS. 31 and 32, on the one hand, and the second switch-over position illustrated in FIGS. 35 and 36. It becomes clear from a comparison of FIGS. 33 and 34, on the one hand, and FIGS. 35 and 36, on the other hand, that the first annular seal that here is configured as an O-ring 40 under the pressure of the flow of incident fluid in the second switch-over position is deformable in such a manner that said O-ring 40 seals the annular gap between the external circumference of the valve piston 6 and the internal circumference of the valve housing 2. Since the first annular seal that here is configured as an O-ring 40 seals the valve piston 6 only once the second switch-over position has been reached, or on the way thereto, respectively, significantly less friction results in comparison to an annular seal which seals the valve piston 6 permanently in relation to the valve housing 2. On account of the sealing of the valve piston 6 in the second switch-over position as illustrated, all the water flows through the valve piston 6 and the flow regulator 11 that is provided therein, on account of which an optimized controlled-operation curve of this flow regulator 11 results.

Figure 39:
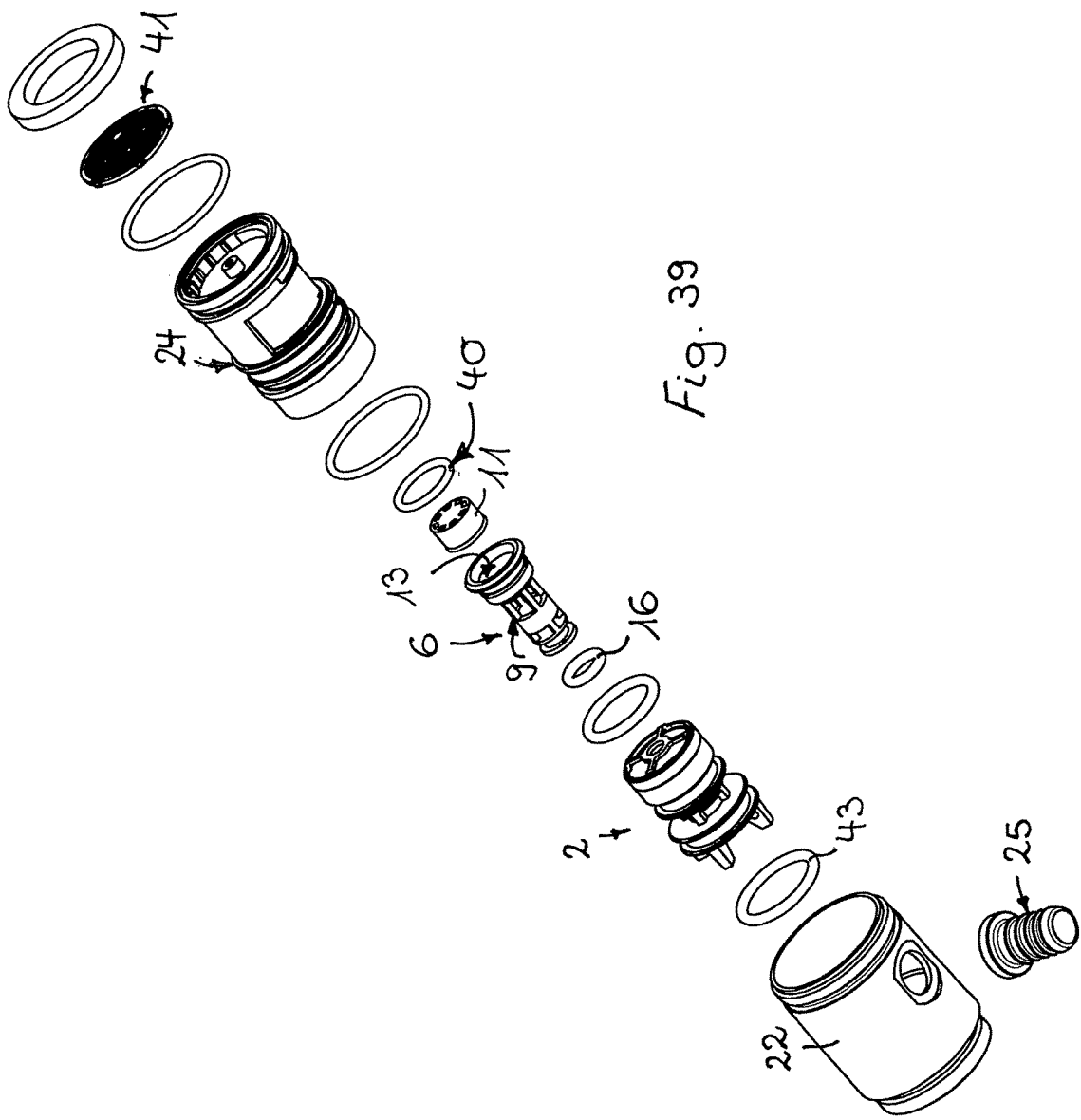
FIG. 39 shows the change-over valve of FIGS. 37 and 38 that with the aid of the insert housing has been inserted into the coupling housing, in an exploded perspective illustration of the individual parts thereof.

A further exemplary embodiment of the change-over valve 1 is illustrated in FIGS. 37 to 39. The embodiment illustrated here differs from the exemplary embodiments shown previously substantially only in terms of the axial alignment of the change-over valve 1, the valve piston 6 thereof being guided here so as to be displaceable in the flow direction of the flow of incident fluid in the valve housing 2. The incident flow of fluid herein initially flows through the filter screen 41 that is disposed upstream on the inflow side, so as to subsequently be deflected in a radially outward manner on the inflow end side of the insert housing 24. The fluid that is deflected radially outward flows thereupon by way of a duct portion 42 that is provided in the insert housing 24 and is oriented in the axial direction into the valve housing 2 which to this end on the housing circumference thereof has the valve inlet 3. The valve piston 6 in the valve housing 2 is displaceable between a first switch-over position (cf. FIG. 37), in which the fluid is guided by way of a flow path that is routed through one first valve outlet 4, to a second switch-over position (cf. FIG. 38), in which the fluid is guided through a flow path that is routed by way of a second valve outlet 5, as soon as that portion of the second flow path that is routed beyond the change-over valve 1 has been released. The valve piston 6 of the change-over valve 1 that is shown in FIGS. 37 to 39 is also configured as a hollow body through which the fluid in the course of at least one of the flow paths is routed by way of at least one piston inlet 9 that is disposed on the piston circumference. The fluid that is routed by way of the at least one piston inlet 9 in the course of the second flow path is routed by way of a first piston outlet 5 that is provided on that piston end side that faces away from the piston base 10, wherein a flow throttle, a return flow preventer, or a flow regulator 11, as is the case here, is provided in this first piston outlet. This flow regulator 11 here is configured as an insert cartridge, said insert cartridge being inserted into a cartridge receptacle 13 in the hollow body interior of the valve piston 6. The insert opening of this cartridge receptacle 13 is disposed on that piston end side of the valve piston 6 that faces away from the piston base 10. The valve piston 6 of the change-over valve 1 that is shown in FIGS. 37 to 39 on that piston end side thereof that faces away from the piston base 10 also has an external circumference that is comparatively larger than that of the piston base 10.

LIST OF REFERENCE SIGNS

1 Change-over valve
2 Valve housing
3 Valve inlet (of valve housing 2)
4 Valve outlet (for the first flow path)
5 Valve outlet (for the second flow path)
6 Valve piston
7 Housing inner wall portion
9 Piston inlet
10 Piston base
11 Flow regulator
12 Flow throttle
13 Cartridge receptacle
14 First annular seal, configured as a lip seal
15 Sealing lip
16 Second annular seal
17 Second piston outlet
18 Anti-rotation safeguard
19 Securing spring
20 Securing groove
21 Rolling diaphragm
22 Coupling housing
23 Sleeve-shaped housing portion (of coupling housing 22)
24 insert housing
25 Lateral line connector (for the second flow path)
26 Insert detent
27 Housing receptacle
28 Head shower
29 Hand shower
30 Outflow fitting
31 Water filter
32 Annular seal
33 Annular seal
34 Sealing ring
35 Sealing ring
36 Housing inlet duct
37 Housing outlet duct
38 (Cylindrical) housing inner wall portion
39 Edge
40 First annular seal, configured as an O-ring
41 Filter screen
42 Duct portion

The invention claimed is:

1. A sanitary change-over valve (1) comprising a valve housing (2) which has one valve inlet (3) and first and second selectively actuatable valve outlets (4, 5), a valve piston (6) which is movable from a first switch-over position in which fluid is guided by a first flow path routed through the first valve outlet (4) to a second switch-over position in which the fluid is guided by a second flow path routed to the second valve outlet (5) as soon as a portion of the second flow path that is routed beyond the change-over valve (1) has been released, the valve piston (6) is configured as a hollow body through which the fluid in the course of at least one of the flow paths is routed by at least one piston inlet (9) that is disposed on a piston circumference, the fluid that is routed by the at least one piston inlet (9) in the course of the second flow path is routed by a first piston outlet that is provided on a piston end side that faces away from a piston base (10), and a flow throttle (12), a flow regulator (11), or a return flow preventer is provided in the first piston outlet, wherein the flow throttle (12), the flow regulator (11), or the return flow preventer is configured as an insert cartridge, and a cartridge receptacle (13) is provided in an interior of the hollow-body of the valve piston (6), an insert opening of said cartridge receptacle (13) being disposed on the piston end side of the valve piston that faces away from the piston base.

2. The sanitary change-over valve as claimed in claim 1, wherein the valve piston (6) on the piston end side thereof that faces away from the piston base (10) has an external circumference that is larger than an external circumference of the piston base (10).

3. The sanitary change-over valve as claimed in claim 1, wherein the valve piston (6) on a front end region thereof that faces away from the piston base (10) on a side of an external circumference has at least one first annular seal which is configured as an encircling lip seal (14), said lip seal (14) having at least one sealing lip (15) which is disposed obliquely to a sliding path of the valve piston (6) in such a manner that a free lip end of the at least one sealing lip (15) points in a direction that faces away from the piston base (10).

4. The sanitary change-over valve as claimed in claim 1, wherein the valve piston (6) on a front end region thereof that faces away from the piston base on a side of an external circumference has a first annular seal that is designed as an O-ring (40) which (40) under a pressure of a flow of incident fluid in the second switch-over position is adapted to deform in such a manner that said annular seal seals an annular gap between the external circumference of the valve piston (6) and an internal circumference of the valve housing (2).

5. The sanitary change-over valve as claimed in claim 4, wherein the valve piston (6) on the front end region thereof that faces the piston base (10) on a side of the external circumference has at least one second annular seal (16) that projects beyond the piston circumference, said second annular seal (16) in the second switch-over position bears on an annularly encircling housing inner wall portion (7) that tapers toward the valve piston (6).

6. The sanitary change-over valve as claimed in claim 5, wherein the valve piston (6) on the piston circumference thereof has at least one second piston outlet (17) by which the first flow path of the fluid is routed.

7. The sanitary change-over valve as claimed in claim 6, wherein the at least one second piston outlet (17) is provided in a piston portion that is disposed between the first annular seal (14, 40), and the second annular seal (16).

8. The sanitary change-over valve as claimed in claim 7, wherein the housing inner wall portion (7) that tapers toward the valve piston (6) is separated from a neighboring cylindrical housing inner wall portion (38) by an edge (39), and the valve piston (6) in the second switch-over position is adapted to move under pressure of a flow of incident fluid from a first sliding position in which the valve piston (6) by way of the second annular seal (16) thereof bears in a sealing manner on the edge (39) to a second sliding position in which the second annular seal (16) bears in a radially sealing manner on the neighboring cylindrical housing inner wall portion (38).

9. The sanitary change-over valve as claimed in claim 1, wherein the valve piston (6) that is displaceably guided in the valve housing (2) is guided in a rotationally secured manner by an anti-rotation safeguard (18).

10. The sanitary change-over valve as claimed in claim 9, wherein the anti-rotation safeguard has at least one securing groove or securing spring (19) that is disposed on the piston circumference of the valve piston (6) and interacts with an assigned securing spring or securing groove (20) on a housing internal circumference of the valve housing (2) that borders a sliding path of the valve piston.

11. The sanitary change-over valve as claimed in claim 1, wherein the valve piston (6) on the front end region thereof that faces away from the piston base (10) in relation to a housing internal circumference of the valve housing (2) that borders the valve piston (6) along a sliding path thereof is sealed by a rolling diaphragm (21) or a diaphragm seal which is held tightly on the piston circumference, and on the housing internal circumference.

12. A sanitary functional group having a change over valve (1), comprising a valve housing (2) which has one valve inlet (3) and first and second selectively actuatable valve outlets (4, 5), a valve piston (6) which is movable from a first switch-over position in which fluid is adapted to be guided by a first flow path routed through the first valve outlet (4) to a second switch-over position in which the fluid is guided by a second flow path routed to the second valve outlet (5) as soon as a portion of the second flow path that is routed beyond the change-over valve (1) has been released, the valve piston (6) is configured as a hollow body through which the fluid in the course of at least one of the flow paths is adapted to be routed by at least one piston inlet (9) that is disposed on a piston circumference, the fluid that is routed by the at least one piston inlet (9) in the course of the second flow path is routed by a first piston outlet that is provided on a piston end side that faces away from a piston base (10), and a flow throttle (12), a flow regulator (11), or a return flow preventer is provided in the first piston outlet, wherein the valve housing (2) of said change-over valve being inserted into an insert housing (24), said insert housing (24) being disposed in a coupling housing, said coupling housing (22) having a sleeve-shaped housing portion (23) for receiving the insert housing (24), a line connector (25) for the second flow path being provided laterally on said sleeve-shaped housing portion (23), one front end of the sleeve-shaped housing portion (23) receives the insert housing (24) on which a line connector (25) for the second flow path is provided laterally, the one front end of the sleeve-shaped housing portion (23) forms a housing inlet of the coupling housing (22) and another front end forms a housing outlet of the coupling housing.

13. The sanitary functional group as claimed in claim 12, wherein the insert housing (24) from the inlet-side front side of the coupling housing (22) is push-fittable into the coupling housing up to an insert detent (26).

14. The sanitary functional group as claimed in claim 13, wherein the insert housing (24) has a housing receptacle (27) for the valve housing (2), and said housing receptacle (27) of the insert housing (24) has an insert opening which is provided on a housing circumference of the insert housing (24).

* * * * *